(12) United States Patent
Matsunaga et al.

(10) Patent No.: US 11,531,444 B2
(45) Date of Patent: *Dec. 20, 2022

(54) INFORMATION PROCESSING APPARATUS

(71) Applicant: NTT DOCOMO, INC., Chiyoda-ku (JP)

(72) Inventors: Yuki Matsunaga, Chiyoda-ku (JP); Aya Murakami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/420,604

(22) PCT Filed: Feb. 19, 2020

(86) PCT No.: PCT/JP2020/006442
§ 371 (c)(1),
(2) Date: Jul. 2, 2021

(87) PCT Pub. No.: WO2020/171108
PCT Pub. Date: Aug. 27, 2020

(65) Prior Publication Data
US 2022/0083196 A1    Mar. 17, 2022

(30) Foreign Application Priority Data

Feb. 19, 2019  (JP) .............................. JP2019-027277

(51) Int. Cl.
*G06F 3/04812*   (2022.01)
*G06F 3/01*      (2006.01)
*G06F 3/0482*    (2013.01)

(52) U.S. Cl.
CPC .......... *G06F 3/04812* (2013.01); *G06F 3/017* (2013.01); *G06F 3/0482* (2013.01)

(58) Field of Classification Search
CPC .... G06F 3/04812; G06F 3/017; G06F 3/0482; G06F 3/01; G06F 3/038; G06F 3/0481
See application file for complete search history.

(56) References Cited

U.S. PATENT DOCUMENTS

2009/0027337 A1*   1/2009   Hildreth .................. G06F 3/017
                                                         345/158
2009/0217211 A1*   8/2009   Hildreth ................ G06F 3/0304
                                                         715/863

(Continued)

FOREIGN PATENT DOCUMENTS

JP       10-198519 A       7/1998

OTHER PUBLICATIONS

International Search Report dated Apr. 7, 2020 in PCT/JP2020/006442 filed on Feb. 19, 2020, 2 pages.

*Primary Examiner* — Cao H Nguyen
(74) *Attorney, Agent, or Firm* — Oblon, McClelland, Maier & Neustadt, L.L.P.

(57) ABSTRACT

An information processing apparatus (10) is an information processing apparatus that displays item images (GI-1 to GI-6) that are arranged apart from each other and a cursor (CUR) on a display (20), the information processing apparatus includes a receiver (111) configured to receive operation information corresponding to details of a cursor operation in which a user (U) moves the cursor (CUR); a controller (112) configured to cause the display (20) to display the cursor (CUR), based on the operation information; and a determiner (113) configured to, when the operation information includes an instruction to move the cursor (CUR) from an inside of one item image from among the item images (GI-1 to GI-6) to an outside of the one item image, determine whether there is another item image within a predetermined distance from the one item image, the another item image being in a direction of movement of the (Continued)

cursor (CUR). When a result of determination made by the determiner (113) is affirmative, the controller (112) is configured to provide, inside the one item image, a deceleration region in which an amount of movement of the cursor per an amount of cursor operation decreases. When the result of determination made by the determiner (113) is negative, the controller (112) is configured not to provide, inside the one item image, the deceleration region.

10 Claims, 9 Drawing Sheets

(56) References Cited

U.S. PATENT DOCUMENTS

| 2013/0227477 A1* | 8/2013 | Yahav | G06F 3/0236 |
| | | | 715/810 |
| 2014/0298252 A1* | 10/2014 | Choi | G06F 3/04886 |
| | | | 715/788 |
| 2019/0155394 A1* | 5/2019 | Bedikian | G06F 3/017 |

* cited by examiner

INFORMATION PROCESSING APPARATUS

TECHNICAL FIELD

The present invention relates to information processing apparatuses.

BACKGROUND ART

In an information processing apparatus using a graphical user interface (GUI), for example, as disclosed in Patent Document 1, an item image such as a button is selected using a pointer. Patent Document 1 discloses that a technology in which, when a pointer enters a specific region around a button on a display screen, operating speed of the pointer increases, and otherwise, when the pointer exits the specific region, operating speed of the pointer decreases.

RELATED ART DOCUMENT

Patent Documents

Patent Document 1: Japanese Patent Application Laid-Open Publication No. H10-198519

SUMMARY OF THE INVENTION

Problem to be Solved by the Invention

In the technology described in Patent Document 1, since the operation of the pointer is decelerated even if there is no other button in a direction in which the pointer exits the button, this may be troublesome for the user.

Means of Solving the Problems

In order to address the above problems, an information processing apparatus that displays item images that are arranged apart from each other and a cursor on a display, the information processing apparatus includes: a receiver configured to receive operation information corresponding to details of a cursor operation in which a user moves the cursor; a controller configured to cause the display to display the cursor, based on the operation information; and a determiner configured to, when the operation information includes an instruction to move the cursor from an inside of one item image from among the item images to an outside of the one item image, determine whether there is another item image within a predetermined distance from the one item image, the another item image being in a direction of movement of the cursor, in which when a result of determination made by the determiner is affirmative, the controller is configured to provide, inside the one item image, a deceleration region in which an amount of movement of the cursor per an amount of the cursor operation decreases, and when the result of determination made by the determiner is negative, the controller is configured not to provide, inside the one item image, the deceleration region.

Effect of the Invention

According to the information processing apparatus of the present invention, since it is determined whether the deceleration region is provided in the selected item image based on the result of determination made by the determiner, it is possible to reduce input operations that are troublesome for the user.

MODES FOR CARRYING OUT THE INVENTION

Figure 1:
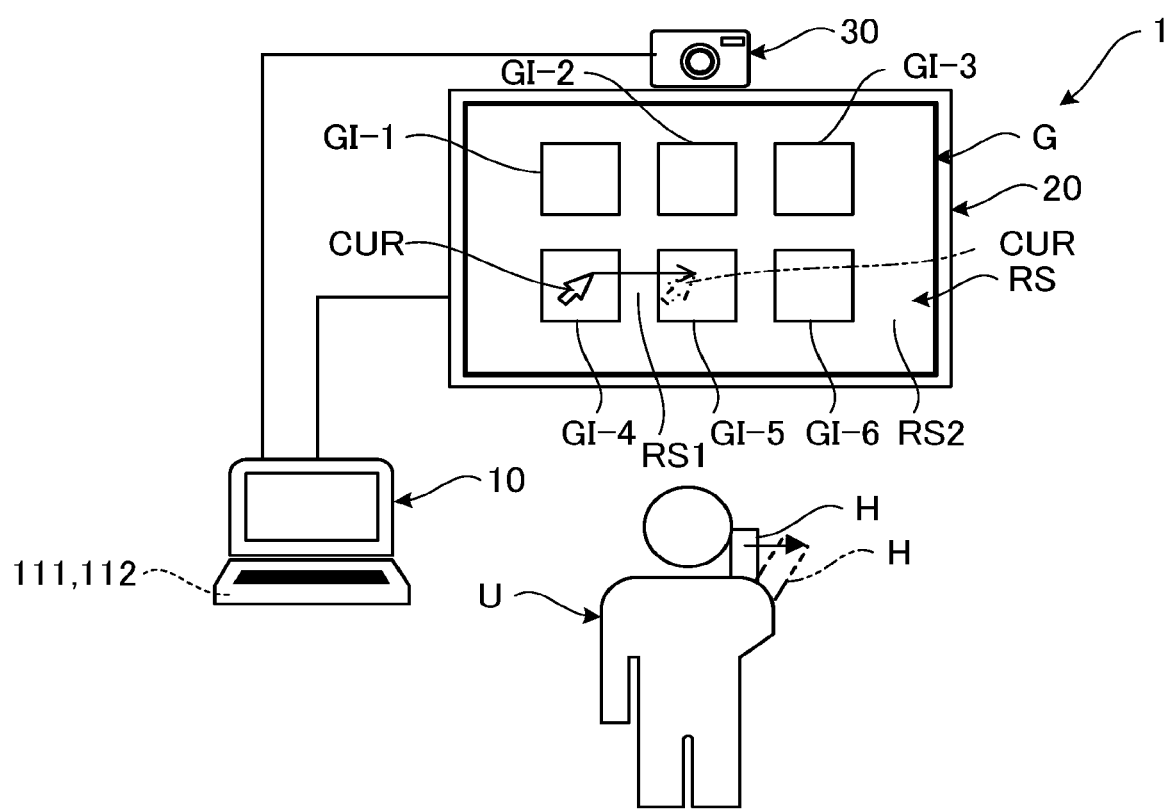
FIG. 1 is an exemplary diagram illustrating an appearance of a configuration of a system using an information processing apparatus according to a first embodiment.

1. First Embodiment 1.1. Overview of System Using Information Processing Apparatus FIG. 1 is a diagram schematically illustrating an appearance of a configuration example of a system 1 using an information processing apparatus 10 according to a first embodiment. The system 1 illustrated in FIG. 1 performs various types of information processing using a graphical user interface. In this embodiment, an information processing apparatus having a configuration in which an input operation is performed according to movement (a gesture) of a hand H of a user U will be described As illustrated in FIG. 1, the system 1 includes an information processing apparatus 10, a display 20, and an imaging device 30. The information processing apparatus 10 is a computer device having a configuration that will be described below in detail. FIG. 1 exemplifies a case in which the information processing apparatus 10 is a laptop computer. The information processing apparatus 10 is not limited to the laptop computer, and may be, for example, a desktop computer, a smartphone or a tablet. In addition, the information processing apparatus 10 may be configured by using ready-made hardware or may be configured by using dedicated hardware.

Various types of display panels, such as a liquid crystal display panel and an organic electroluminescent (EL) display panel, may be used for the display 20. The display 20 may be a projector that projects image light on a screen and displays an image or may be a head-mounted display or a head-up display.

The imaging device 30 captures an image of the user U and outputs data indicative of the captured image. The captured image is constituted, for example, by pixels which are arranged in a matrix. The data includes information on luminance or the like for each pixel of the captured image. The imaging device 30 includes, for example, an imaging optical system and an imaging element. The imaging optical system is an optical system including at least one imaging lens, and may include various optical elements such as a prism and may include a zoom lens, a focus lens, and the like. The imaging element is composed of, for example, a charge coupled device (CCD) image sensor, a complementary MOS (CMOS) image sensor, or the like. In the example illustrated in FIG. 1, the imaging device 30 is installed above the display 20. The installation position of the imaging device 30 is not limited to the example illustrated in FIG. 1 and is freely selected as long as it can capture an image of a user U.

In the system 1, the information processing apparatus 10 causes the display 20 to display an image G including item images GI-1 to GI-6 and a cursor CUR. The information processing apparatus 10 receives an input operation made by the user U, based on the data from the imaging device 30 and moves the cursor CUR. For example, when a hand H moves from a position indicated by a solid line in FIG. 1 to a position indicated by an alternate long and two short dashes line, the cursor CUR moves from the position (an item image GI-4) indicated by the solid line in FIG. 1 to the position (an item image GI-5) indicated by the line with alternating long and two short dashes. In the following description, when the item images GI-1 to GI-6 do not need to be distinguished from each other, each of the item images GI-1 to GI-6 is also referred to as an item image GI.

Here, when the item image GI is selected with the cursor CUR, when there is another item image in a direction of movement of the cursor CUR with respect to the item image GI selected with the cursor CUR, the information processing apparatus 10 reduces an amount of movement of the cursor CUR per unit amount of input operation made by the user U. Therefore, unintentional selection of the other item image GI by the user U is minimized. On the other hand, when there is no other item image in a direction of movement of the cursor CUR relative to the item image GI selected with the cursor CUR, the information processing apparatus 10 does not reduce an amount of movement of the cursor CUR per unit amount of input operation made by the user U. Therefore, the user U can make a quick move of the cursor CUR to the outside of the selected item image GI and perform another cursor operation via a region RS other than the item images GI-1 to GI-6. In the region RS, the user U can continuously change the position of the cursor CUR to a desired position. The region RS includes a circular region RS2 that surrounds the entire set composed of the item images GI-1 to GI-6 in addition to the region RS1.

1.2. Hardware Configuration of System Using Information Processing Apparatus.

Figure 2:
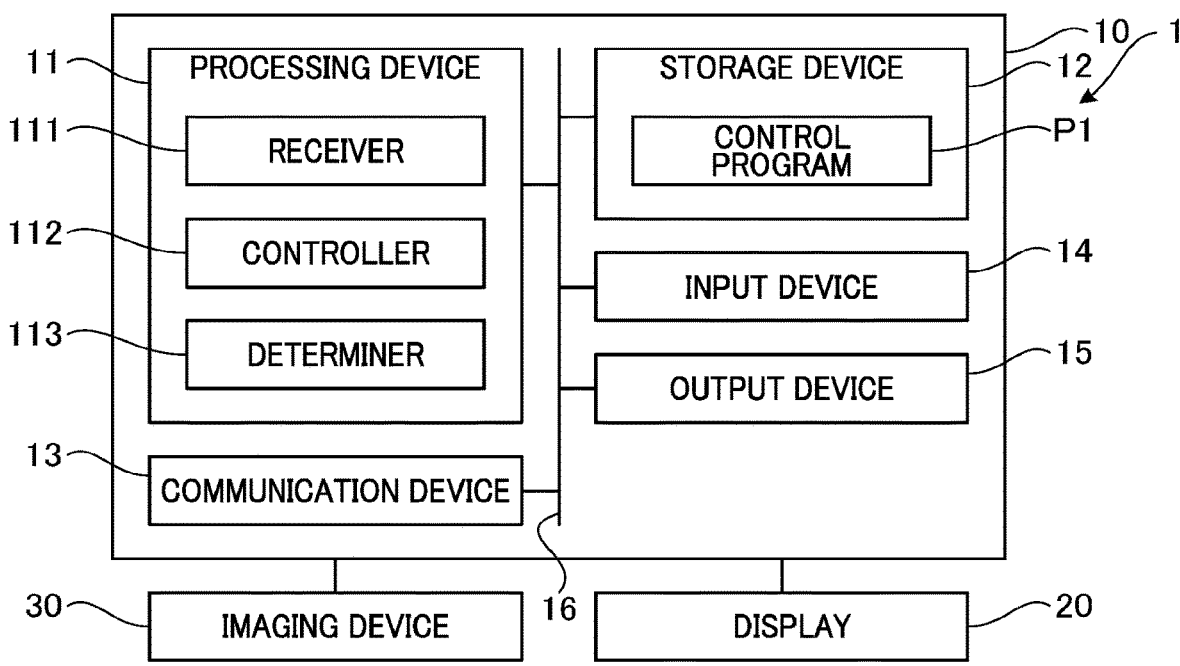
FIG. 2 is a block diagram illustrating a system using the information processing apparatus according to the first embodiment.

FIG. 2 is a block diagram illustrating the system 1 using the information processing apparatus 10 according to the first embodiment. As illustrated in FIG. 2, the information processing apparatus 10 includes a processing device 11, a storage device 12, a communication device 13, an input device 14, an output device 15 and a bus 16 that connects these devices. The bus 16 may be composed of a single bus or may be composed of different buses, depending on the devices.

The processing device 11 is a processor that controls the entire information processing apparatus 10, and is composed of, for example, one or more chips. The processing device 11 is composed of, for example, a central processing unit (CPU) including an interface with peripheral devices, an arithmetic device, a register, and the like. Here, some or all of functions of the processing device 11 may be realized by hardware such as a digital signal processor (DSP), an application specific integrated circuit (ASIC), a programmable logic device (PLD), and a field programmable gate array (FPGA). The processing device 11 executes various processes in parallel or to sequentially.

The storage device 12 is a recording medium that can be read by the processing device 11, and stores programs including a control program P1 executed by the processing device 11 and various types of data used by the processing device 11. For example, the storage device 12 is composed of one or more memory circuits such as a read only memory (ROM), an erasable programmable ROM (EPROM), an electrically erasable programmable ROM (EEPROM), and a random access memory (RAM).

The communication device 13 is a device that communicates with other devices. The communication device 13 has a function of communicating with other devices via a network such as a mobile communication network or the Internet and a function of communicating with other devices through short-range wireless communication. Examples of short-range wireless communication include Bluetooth (registered trademark), ZigBee, and WiFi (registered trademark). In the present embodiment, the communication device 13 has a function of communicating with the above display 20 and imaging device 30.

The input device 14 receives an input from the outside (for example, a keyboard, a mouse, a microphone, a switch, a button, and a sensor). The input device 14 may include the above imaging device 30. The input device 14 may be provided as necessary or may be omitted.

The output device 15 performs output to the outside (for example, a display, a speaker, and an LED lamp). The output device 15 may be unitary with the input device 14 (for example, a touch panel). The output device 15 may include the above display 20. In addition, the output device 15 may be provided as necessary or may be omitted.

1.3. Function of Information Processing Apparatus

The processing device 11 serves as a receiver 111 and a controller 112 by executing the control program P1 read from the storage device 12. Therefore, the information processing apparatus 10 includes the receiver 111, the controller 112, and a determiner 113.

The receiver 111 receives operation information corresponding to details of a cursor operation for allowing a user U to move the cursor CUR. The receiver 111 according to this embodiment detects a gesture of the user U on the basis of data from the imaging device 30 and receives operation information corresponding to details of the cursor operation using the gesture. Specifically, the receiver 111 identifies the position of the hand H of the user U from a captured image indicated by data from the imaging device 30, considers movement of the position as the cursor operation of the user U, and outputs a signal including the operation information corresponding to details of the cursor operation. For example, the receiver 111 detects the hand H in a specific state, and receives the operation information in a period in which the hand H is in the specific state. The specific state is not particularly limited, and an example thereof is a state in which the user U holds the palm of the hand H up to the display 20 or the imaging device 30. The position of the hand H is identified, for example, as coordinate values in a two-dimensional coordinate system which is set in the captured image. The operation information is, for example, information indicative of change in the coordinate values in the two-dimensional coordinate system which is set in the captured image. For example, an image processing technique, such as template matching, may be used to detect a gesture in the receiver 111. Determination criteria for detection of a gesture in the receiver 111 may change, for example, depending on results of machine learning or the like.

The controller 112 causes the display 20 to display the item images GI and the cursor CUR. The controller 112 causes the display 20 to display the cursor CUR on the basis of the operation information from the receiver 111. Specifically, the controller 112 changes the position of the cursor CUR in a display area of the display 20 in accordance with and on the basis of the following two criteria: an amount of a cursor operation based on the operation information from the receiver 111; and a direction of movement of the cursor based on the operation information. For example, when the operation information is information indicative of change in the coordinate values in the two-dimensional coordinate system, the amount of the cursor operation refers to an amount of change (an amount of movement) in the coordinate values. That is, the amount of the cursor operation indicates a distance by which the hand H of the user U has been moved. For example, in a case in which the operation information indicates change in the coordinate values in the two-dimensional coordinate system, the direction of the cursor operation refers to a direction of movement of the coordinate values. Display control of the controller 112 will be described below in detail.

Figure 3:
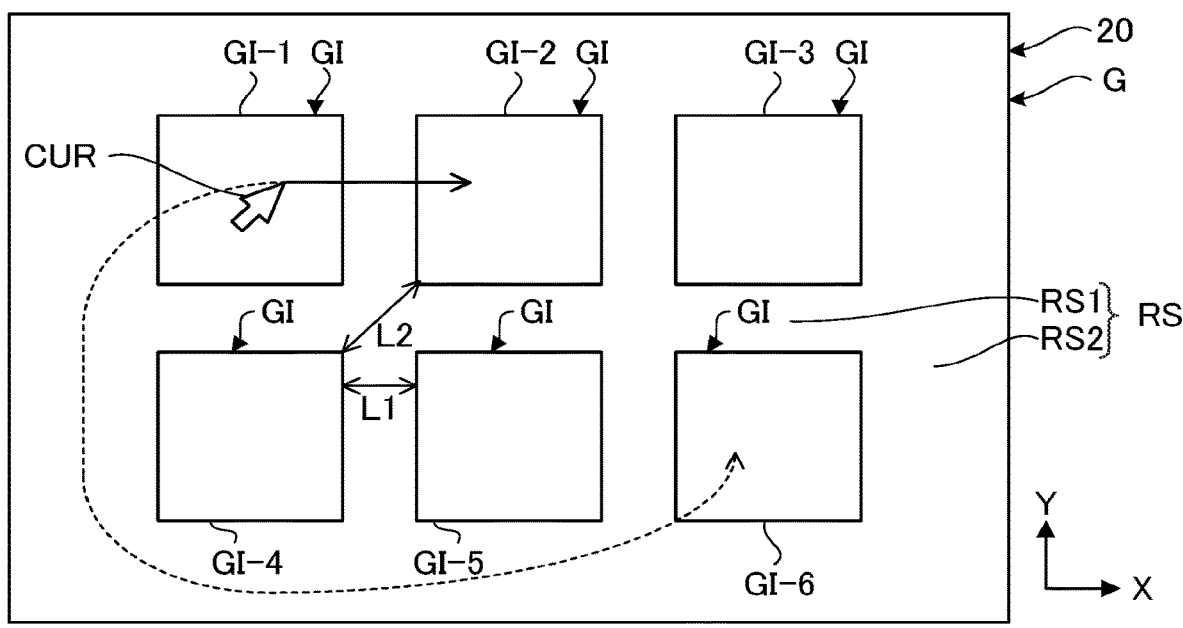
FIG. 3 is a diagram illustrating an example of a screen on a display in the first embodiment.

FIG. 3 is an exemplary diagram illustrating a screen on the display 20. In the following description, as illustrated in FIG. 3, the horizontal direction of the display area of the display 20 is defined as an X direction and the vertical direction thereof is defined as a Y direction. As illustrated in FIG. 3, the controller 112 displays an image G including item images GI-1 to GI-6 and a cursor CUR on the display 20. The cursor CUR moves in the image G. Each of the item images GI-1 to GI-6 is, for example, an icon or a button issuing a predetermined instruction when it is selected by the cursor CUR. Here, the item images GI-1 to GI-6 are apart from each other and are arranged in a matrix shape in the X direction and the Y direction. In the example illustrated in FIG. 3, six item images GI-1 to GI-6 have the same shape and size and are arranged at equal intervals in the X direction and the Y direction. The shape, the size, the number, the arrangement, and the like of the item images GI are not limited in the example illustrated in FIG. 3 and are freely selected. The "cursor" may be replaced with a pointer or the like.

As described above, the image G includes a region RS other than the item images GI-1 to GI-6 in addition to the item images GI-1 to GI-6 and the cursor CUR. The region RS includes a region RS1 between the item images GI-1 to GI-6 and a square-enclosed region RS2 surrounding a group including the item images GI-1 to GI-6 as a whole. When the cursor CUR is located in the region RS, the controller 112 continuously changes the position of the cursor CUR according to movement of the hand H. On the other hand, when the cursor CUR is located inside of one item image GI from among the item images GI-1 to GI-6, the controller 112 changes, on the basis of a result of determination made by the determiner 113, behavior of the cursor CUR according to the direction of movement of the cursor CUR. Here, when the operation information from the receiver 111 includes an instruction to move the cursor CUR from the inside of one item image GI from among the item images GI-1 to GI-6 to the outside, the determiner 113 determines whether there is another item image GI within a predetermined distance D from the one item image GI, the other item image GI being in the direction of movement of the cursor CUR.

Figure 4:
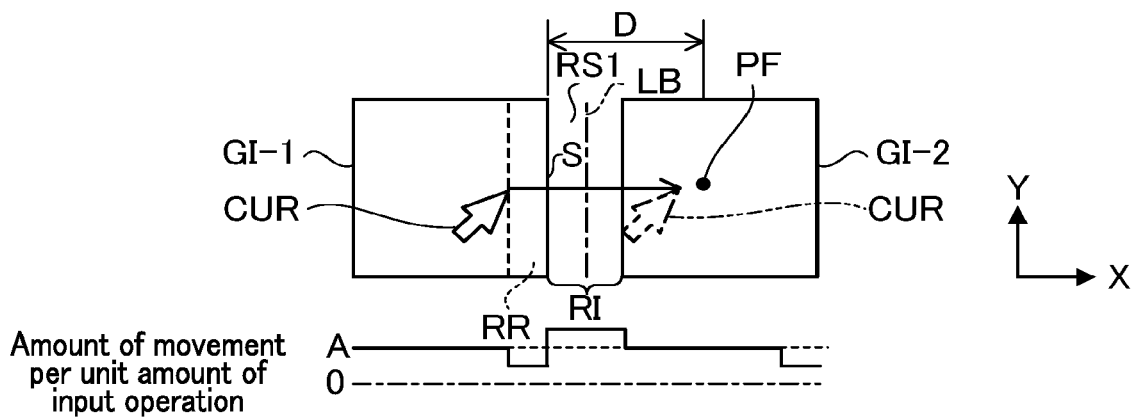
FIG. 4 is a diagram for a case in which there is another item image in a direction of movement of a cursor with respect to a selected item image.

FIG. 4 is a diagram for explaining a case in which there is another item image GI-2 in the direction of movement of the cursor CUR with respect to the selected item image GI-1. In a case illustrated in FIG. 4, since the item image GI-2 is present as another item image GI within the predetermined distance D from the item image GI-1, the item image GI-2 being in the direction (positive side in the X direction) of movement of the cursor CUR, the result of determination made by the determiner 113 is affirmative. For example, the determiner 113 determines whether an outer edge of another item image GI crosses a segment, the segment connecting to a position PF separated the predetermined distance D from the item image GI-1 and the position PF being in the direction of movement of the cursor CUR. When the result of determination made by the determiner 113 is affirmative, the controller 112 provides, inside the selected item image GI-1, a deceleration region RR. The deceleration region RR of the present embodiment is provided in an area on the right side with respect to the dotted line in FIG. 4 inside the item image GI-1 with a predetermined width along the right side S of the item image GI-1. The deceleration region RR is a region in which the amount of movement of the cursor CUR per amount of the cursor operation in the receiver 111 decreases. The degree of decrease is determined according to the width or size of the deceleration region RR, and is not particularly limited, but may be, for example, within a range of 20% or more and 80% or less during a normal period (reference value A). In FIG. 4 exemplifies a case in which the number of other item images GI within the predetermined distance D is one, but the number of other item images GI within the predetermined distance D may be multiple.

Before the cursor CUR reaches the deceleration region RR, the controller 112 according to the embodiment causes the cursor CUR to move according to the amount of the cursor operation with respect to the receiver 111 using the amount of movement of the cursor CUR per amount of movement of the cursor operation in the receiver 111 as the reference value A. Then, when the cursor CUR reaches the deceleration region RR, the controller 112 reduces the amount of movement of the cursor CUR per amount of movement of the cursor operation in the receiver 111 below the reference value A. This provides the user U with a feeling of operation in which it is difficult to separate the cursor CUR from the selected item image GI-1. In addition, in the embodiment, since the deceleration region RR is provided in a part of the item image GI-1 along the outer circumference, it is possible to prevent the cursor CUR from being too difficult to separate from the item image GI-1. When the cursor CUR reaches the outer edge of the item image GI-1, the controller 112 removes the deceleration region RR from the item image GI-1.

In the embodiment, an acceleration region RI is provided in the region RS1 between the item image GI-1 and the item image GI-2. FIG. 4 exemplifies a case in which the acceleration region RI is provided over the entire region RS1. The acceleration region RI is a region in which the amount of movement of the cursor CUR per amount of movement of the cursor operation in the receiver 111 is greater than the reference value A. When the cursor CUR reaches the acceleration region RI, the controller 112 increases the amount of movement of the cursor CUR per amount of movement of the cursor operation in the receiver 111 above the reference value A. This provides the user U with a feeling of input operation in which the cursor CUR sticks to the item image GI-2.

The controller 112 of the embodiment provides a boundary line LB between the item image GI-1 and the item image GI-2. In FIG. 4, the boundary line LB is provided at an intermediate position between the item image GI-1 and the item image GI-2. Then, when the cursor CUR is positioned in the region between the boundary line LB and the item image GI-1, the controller 112 determines that the item image GI-1 is selected with the cursor CUR. On the other hand, when the cursor CUR is positioned in the region between the boundary line LB and the item image GI-2, the controller 112 determines that the item image GI-2 is selected with the cursor CUR. Therefore, it is possible to prevent the case in which neither of the item images GI-1 and GI-2 is selected with the cursor CUR. In addition, the item images GI are arranged apart from each other. Therefore, compared to when the item images GI are arranged in contact with each other, it is easy for the user U to visually acknowledge which of the item images GI-1 and GI-2 is selected with the cursor CUR. The boundary line LB may be unevenly distributed closer to the item image GI-1 than an intermediate position between the item image GI-1 and the item image GI-2 or may be unevenly distributed closer to the item image GI-2. In FIG. 4, the boundary line LB is a straight line parallel to the Y direction. However the boundary line LB may have a curved or bent part or a part inclined with respect to the Y direction. The boundary line LB may be provided as necessary or may be omitted.

An amount of input operation (hereinafter referred to as a "operation amount during selection") required for the controller 112 to move the cursor CUR from the item image GI-1 to the item image GI-2, which is received by the receiver 111, may be the same as, or be different from, an amount of input operation (hereinafter referred to as a "operation amount during non-selection") required for the controller 112 to move the cursor CUR in the region RS other than the item images GI-1 to GI-6 by a distance L1, which is received by the receiver 111. When the operation amount during selection is greater than the operation amount during non-selection, this provides the user U with a feeling of input operation in which the cursor CUR sticks to the item image GI-2. On the other hand, when the operation amount during selection is less than the operation amount during non-selection, this provides the user U with a feeling of input operation in which it is difficult to separate the cursor CUR from the selected item image GI-1.

When the user U moves the cursor CUR from the item image GI-2 to the item image GI-1, the control by the controller 112 is the same as the above case illustrated in FIG. 4, except that the direction of movement of the cursor CUR is different. When the user U moves the cursor CUR between two other item images GI that are adjacent to each other in the X direction, the control by the controller 112 is the same as in the above case illustrated in FIG. 4. When the user U moves the cursor CUR between two item images GI that are adjacent to each other in the Y direction, the control by the controller 112 is the same as the above case illustrated in FIG. 4 except that the direction of movement of the cursor CUR is different. In addition, as in the case in which the user U moves the cursor CUR from the item image GI-1 to the item image GI-5, when the user U moves the cursor CUR between two other item images GI that are adjacent to each other in the direction inclined with respect to the X direction and the Y direction, the control by the controller 112 is the same as the above case illustrated in FIG. 4 except that the direction of movement of the cursor CUR is different.

Figure 5:
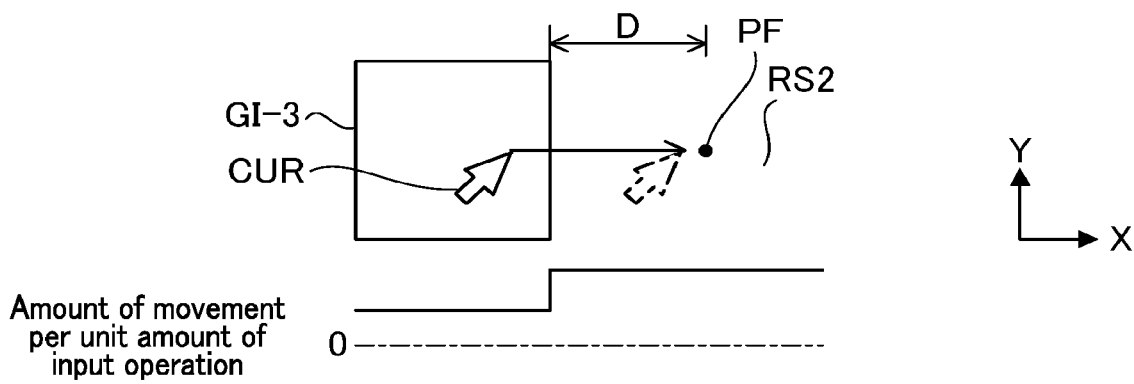
FIG. 5 is a diagram for explaining a case in which there is not another item image in a direction of movement of a cursor with respect to a selected item image.

FIG. 5 is a diagram for explaining a case in which there is no item image GI in the direction of movement of the cursor CUR with respect to the selected item image GI-3. In the case illustrated in FIG. 5, since there is no item image GI within the predetermined distance D from the item image GI-3 in the direction of movement of the cursor CUR (positive direction of X), the result of determination made by the determiner 113 is negative. When the result of determination made by the determiner 113 is negative, as illustrated in FIG. 5, the controller 112 does not provide, inside the item image GI-3, the above deceleration region RR. Therefore, the user U can make a quick move of the cursor CUR from the inside of the item image GI-3 to the region RS. In the region RS, the user U can continuously change the position of the cursor CUR to a desired position. For example, when the user U moves the cursor CUR from the item image GI-1 to the region RS, as indicated by the dotted line in FIG. 3, the user U can make a quick move of the cursor CUR to the item image GI-6 furthest from the item image GI-1 via the region RS2.

When the cursor CUR is positioned in the region RS other than on the item images GI-1 to GI-6, the controller 112 of the embodiment sets the amount of movement of the cursor CUR per amount of the cursor operation indicated by the operation information received by the receiver 111 (amount of movement per unit amount of input operation) to be greater than when the cursor CUR is positioned inside one item image GI among the item images GI-1 to GI-6. The controller 112 of the embodiment has a low speed mode and a high speed mode, and switches the used mode between these modes based on the operation information from the receiver 111. The low speed mode refers to a mode in which the amount of movement of the cursor CUR per unit amount of input operation is a first movement amount. The high speed mode refers to a mode in which the amount of movement of the cursor CUR per unit amount of input operation is a second movement amount greater than the first movement amount. In this manner, when the amount of movement of the cursor CUR per unit amount of input operation is set to be different between the inside and outside the item image GI, compared to when the amount of movement of the cursor CUR per amount of movement of the cursor operation in the receiver 111 is constant, it is possible to improve the operability of the cursor CUR in the region RS.

When the cursor CUR is positioned in the region RS, the controller 112 preferably changes the amount of movement of the cursor CUR per amount of movement of the cursor operation in the receiver 111 according to the following two criteria: the position between the cursor CUR; and the item image GI from among the item images GI-1 to GI-6, the item image GI being in the direction of movement of the cursor CUR. In this case, compared to when the amount of movement of the cursor CUR per amount of movement of the cursor operation in the receiver 111 is constant, the operability of the cursor CUR is improved. For example, when the item image GI in the direction of movement of the cursor CUR is farther from the cursor CUR, the amount of movement of the cursor CUR per amount of movement of the cursor operation in the receiver 111 is set to be greater.

Therefore, the user U can easily make a quick and accurate move of the cursor CUR to the desired item image GI.

When the user U moves the cursor CUR from the item image GI-6 to the region RS, the control by the controller 112 is the same as the above case illustrated in FIG. 5. When the user U moves the cursor CUR from the other item image GI to the region RS, the control by the controller 112 is the same as in the above case illustrated in FIG. 5, except that the direction of movement of the cursor CUR is different.

1.4. Operation of Information Processing Apparatus

Figure 6:
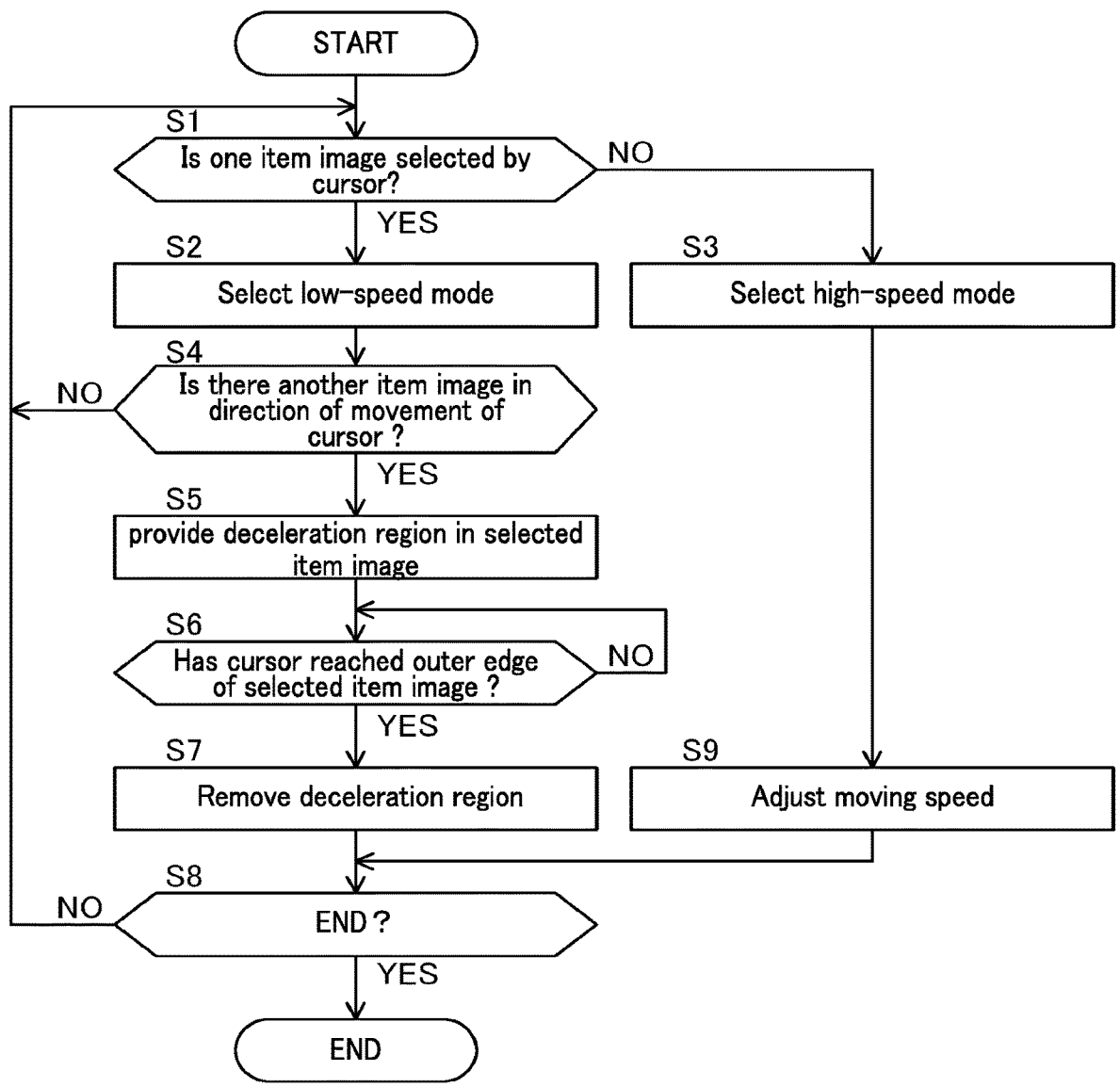
FIG. 6 is a flowchart illustrating operations of the information processing apparatus according to the first embodiment.

FIG. 6 is a flowchart illustrating operations of the information processing apparatus 10 according to the first embodiment. A flow of control of the cursor CUR will be described below with reference to FIG. 6. As illustrated in FIG. 6, first, the determiner 113 determines whether one item image GI is selected from among the item images GI-1 to GI-6 with the cursor CUR (S1). When the result of determination at Step S1 is affirmative, the controller 112 selects a low speed mode (S2). On the other hand, when the result of determination at Step S1 is negative, the controller 112 selects a high speed mode (S3).

After Step S2, the determiner 113 determines whether there is another item image GI within the predetermined distance D from the selected item image GT, the other item image GI being in the direction of movement of the cursor CUR (S4). When there is no other item image GI within the predetermined distance D, the process returns to the above Step S1.

When there is another item image GI within the predetermined distance D, the controller 112 provides the deceleration region RR in the selected item image GI (S5). Then, the controller 112 determines whether the cursor CUR has reached the outer edge of the selected item image GI (S6). This Step S6 is repeated before the cursor CUR reaches the outer edge of the selected item image GI.

When the cursor CUR reaches the outer edge of the selected item image GI, the controller 112 removes the deceleration region RR (S7). Then, the controller 112 determines whether there is an end instruction (S8). When there is no end instruction, the process returns to the above Step S1. On the other hand, when there is an end instruction, the series of processes ends.

After the above Step S3, the controller 112 adjusts the amount of movement of the cursor CUR per unit amount of input operation based on the position between the item image GI in the direction of movement of the cursor CUR and the cursor CUR (S9). Then, the process transitions to the above Step S8.

In the above information processing apparatus 10, when the cursor CUR is moved from the inside to the outside of one item image GI from among the item images GI-1 to GT-6, the controller 112 determines whether there is another item image GI within the predetermined distance D from the selected item image GI, the other item image GI being in the direction of movement of the cursor CUR. Then, when there is another item image GI within the predetermined distance D, the controller 112 provides, inside the one item image GI, the deceleration region RR in which the movement amount of the cursor CUR per movement amount of the cursor operation in the receiver 111 decreases. Therefore, unintentional selection of the other item image GI is minimized.

On the other hand, the controller 112 does not provide the deceleration region RR when the other item image GI is not within the predetermined distance D. Therefore, the user U can quickly move the cursor CUR to the outside of the one item image GI and perform another input operation. For example, the user U can make a quick move of the cursor CUR from the one item image GI to a desired item image GI, which is an item image other than the other item image GI from among the item images GI-1 to GI-6.

2. Second Embodiment

A second embodiment of the present invention will be described below. In the following exemplary embodiment, components having the same operations and functions as those in the first embodiment will be denoted with the same reference numerals used in the description of the first embodiment, and detailed descriptions thereof will be appropriately omitted.

Figure 7:
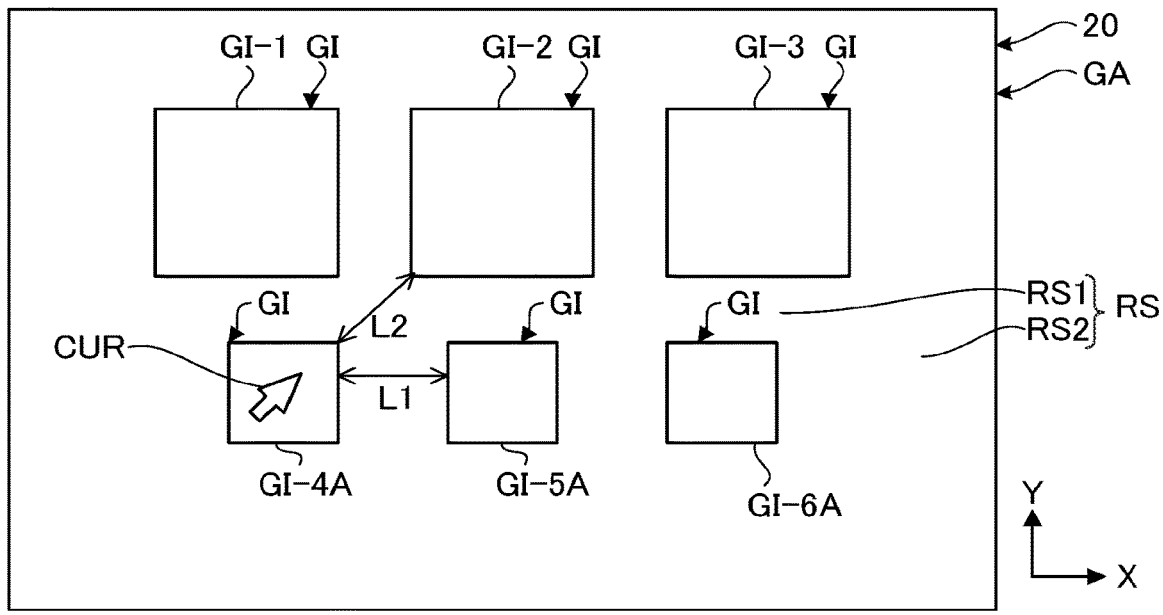
FIG. 7 is a diagram illustrating an example of a screen on a display in a second embodiment.

FIG. 7 is a diagram illustrating an example of display on the display 20 in the second embodiment. As illustrated in FIG. 7, the controller 112 of the present embodiment causes the display 20 to display an image GA. The image GA is the same as the image G of the above first embodiment, except that it includes item images GI-4A, GI-5A and GI-6A in place of the item images GI-4, GI-5 and GI-6. The item images GI-4A, GI-5A and GI-6A are separated from each other and arranged in the X direction. In addition, the size of each of the item images GI-4A, GI-5A and GI-6A is smaller than the size of each of the item images GI-4, GI-5 and GI-6.

Figure 8:
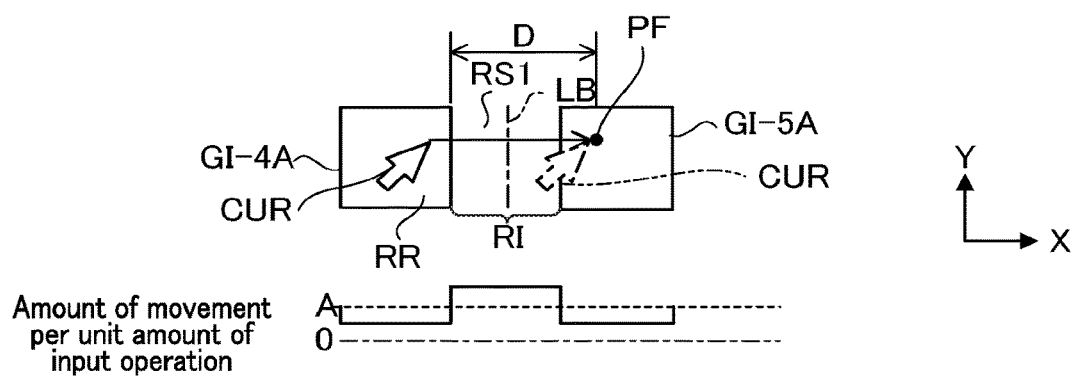
FIG. 8 is a diagram for explaining a case in which there is another item image in a direction of movement of a cursor relative to a selected item image in the second embodiment.

FIG. 8 is a diagram for explaining a case in which there is another item image GI-5A in a direction of movement of the cursor CUR with respect to the selected item image GI-4A in the second embodiment. As illustrated in FIG. 8, when there is another item image GI-5A within the predetermined distance D from the selected item image GI-4A, the other item image GI-5A being in the direction of movement of the cursor CUR (positive side in the X direction), the controller 112 provides the deceleration region RR inside the selected item image GI-4A. In the embodiment, the deceleration region RR is provided over the entire item image GI-4A. Therefore, even if the size of the item image GI-4 is smaller than the size of the item image GI-1 or the like, unintentional movement of the cursor CUR from the item image GI-4 is minimized.

When any of the item images GI-1 to GI-3 is selected with the cursor CUR, as in the above first embodiment, the controller 112 controls movement of the cursor CUR. Therefore, in the item images GI-4A, GI-5A and GI-6A, the deceleration region RR is provided over the entire item image GI. In the item images GI-1, GI-2 and GI-3, the deceleration region RR is provided in a partial region of the item image GI. In this manner, the ratio of the size of the deceleration region RR to the size of the item image GI changes according to whether the selected item image GI is the item image GI-4A, GI-5A or GI-6A, or the item image GI-1, GI-2 or GI-3. That is, the controller 112 of the present embodiment sets the ratio of the size of the deceleration region RR to the size of the selected item image GI according to the size of the selected item image GI. More specifically, the controller 112 increases the ratio as the size of the selected item image GI decreases. Therefore, both reduction of erroneous input operations and improvement of operability are achieved.

Figure 9:
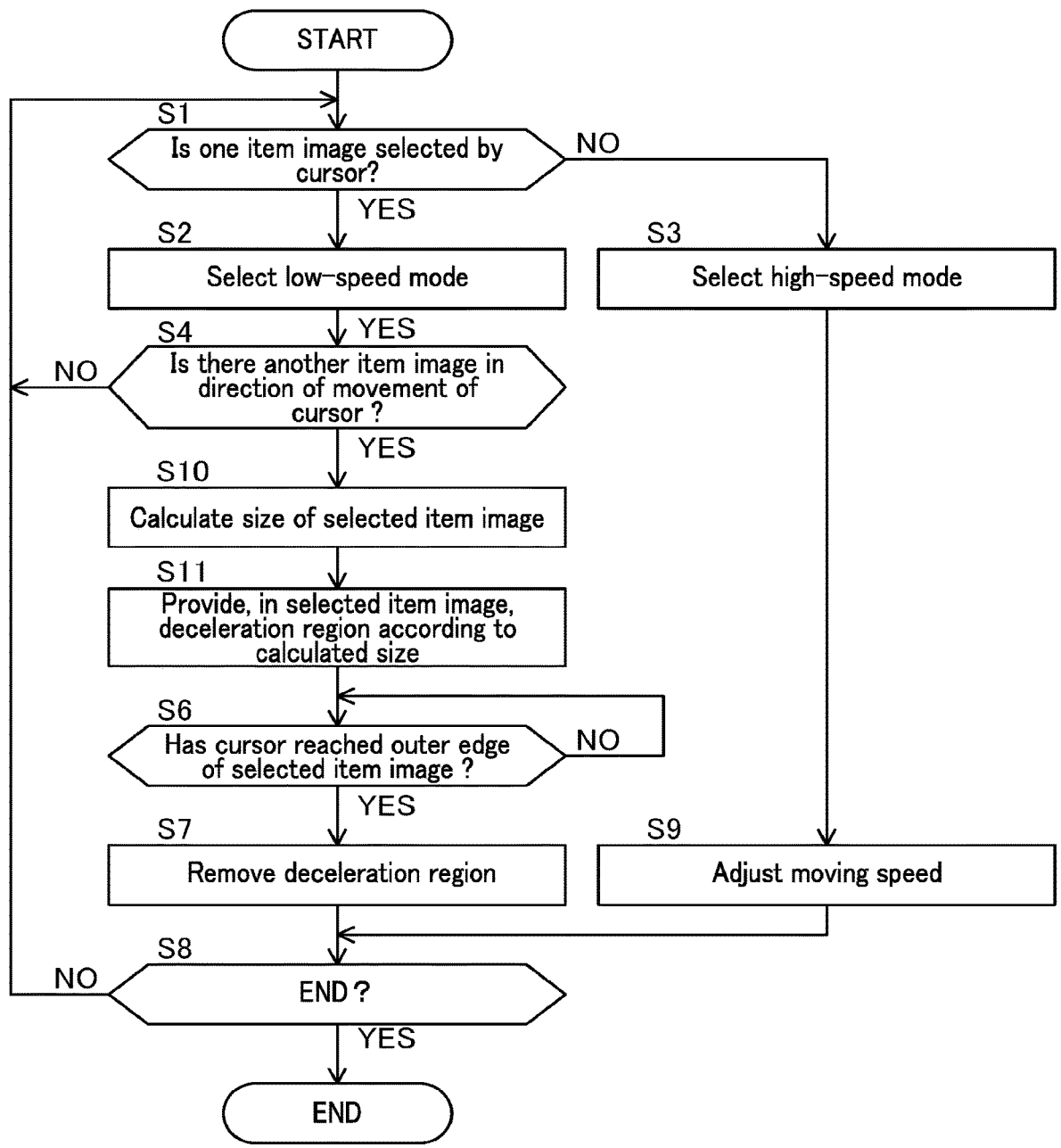
FIG. 9 is a flowchart illustrating operations of the information processing apparatus according to the second embodiment.

FIG. 9 is a flowchart illustrating operations of the information processing apparatus according to the second embodiment. A flow of control of the cursor CUR performed by the controller 112 of the embodiment will be described below with reference to FIG. 9. As illustrated in FIG. 9, as in the above first embodiment, the controller 112 first executes the processes of Steps S1, S2, S3 and S4. In Step S4, when there is another item image GI within the predetermined distance D, the controller 112 calculates the size of the selected item image GI (S10). Then, the controller 112 provides the deceleration region RR having the size ratio based on the calculated size in the selected item image GI (S11). After the process of Step S11 is executed, the controller 112 executes the processes of Steps S6 to S8 as in the above first embodiment. According to the above embodiment, in addition to the same effects as in the above first embodiment, even if the item images GT having different sizes are mixed, the embodiment provides an advantage in that both reduction of erroneous input operations and improvement of operability are achieved.

3. Modifications

The present invention is not limited to the embodiments exemplified above. Specific modifications will be described below. Two or more modes freely selected from the following examples may be combined.

(1) In the above embodiments, a case is exemplified in which the amount of movement of the cursor CUR per amount of movement of the cursor operation in the receiver 111 is constant in each of the deceleration region RR and the acceleration region RI. However, the present invention is not limited to this example, and the amount of movement of the cursor CUR per amount of movement of the cursor operation in the receiver 111 may change.

Figure 10:
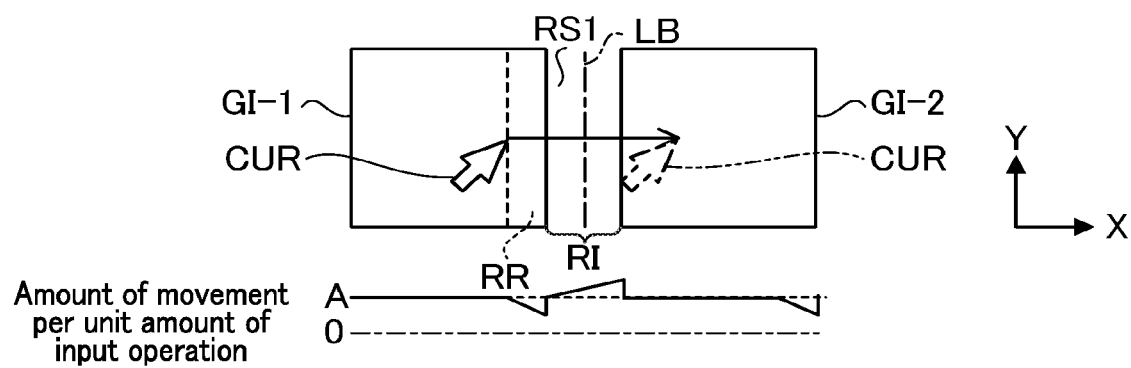
FIG. 10 is a diagram for describing a case in which there is another item image in a direction of movement of a cursor with respect to a selected item image in modification 1.

FIG. 10 is a diagram for describing a case in which there is another item image GI-2 in the direction of movement of the cursor CUR with respect to the selected item image GI-1 in modification 1. In modification 1 illustrated in FIG. 10, the amount of movement of the cursor CUR per amount of movement of the cursor operation in the receiver 111 in the deceleration region RR gradually decreases toward the outer edge of the item image GI-1. This provides the user with a more natural feeling of input operation when the cursor CUR reaches the deceleration region RR. In modification 1 illustrated in FIG. 10, the amount of movement of the cursor CUR per amount of movement of the cursor operation in the receiver 111 in the acceleration region RI gradually increases toward the outer edge of the item image GI-2. This provides the user with a more natural feeling of input operation when the cursor CUR reaches the acceleration region RI.

(2) In the above embodiments, a case is exemplified in which the boundary line LB is provided between two adjacent item images GI. However, the present invention is not limited to this example, and the boundary line LB may be omitted.

Figure 11:
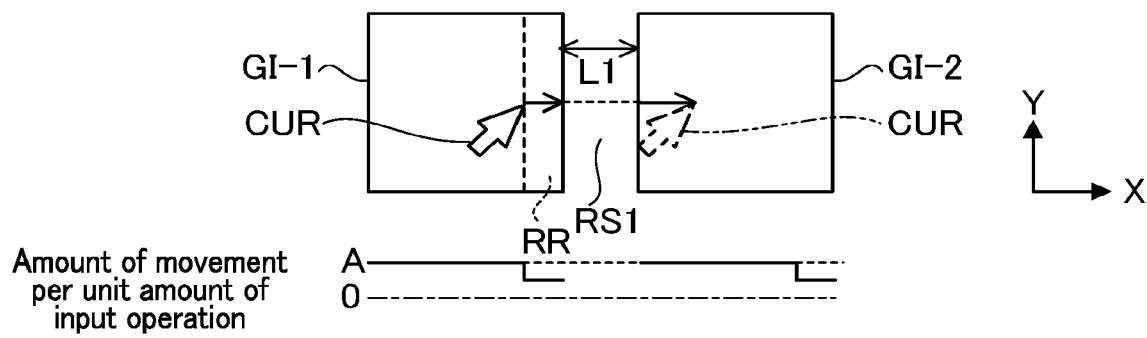
FIG. 11 is a diagram for explaining a case in which there is another item image in a direction of movement of a cursor relative to a selected item image in modification 2.

FIG. 11 is a diagram for explaining a case in which there is another item image GI-2 in the direction of movement of the cursor CUR with respect to the selected item image GI-1 in modification 2. In modification 2 illustrated in FIG. 11, when the cursor CUR reaches the outer edge of the selected item image GI-1, the cursor CUR moves to the item image GI-2 without passing through the region RS1 between the item image GI-1 and the item image GI-2. In the above modification 2, it is possible to prevent both the item images GI-1 and GI-2 from being selected with the cursor CUR.

(3) In the above embodiments, a configuration is exemplified in which the display 20 and the imaging device 30 are separated from the information processing apparatus 10. However, the present invention is not limited to this configuration. For example, one or both of the display 20 and the imaging device 30 may be integrated with the information processing apparatus 10.

Figure 12:
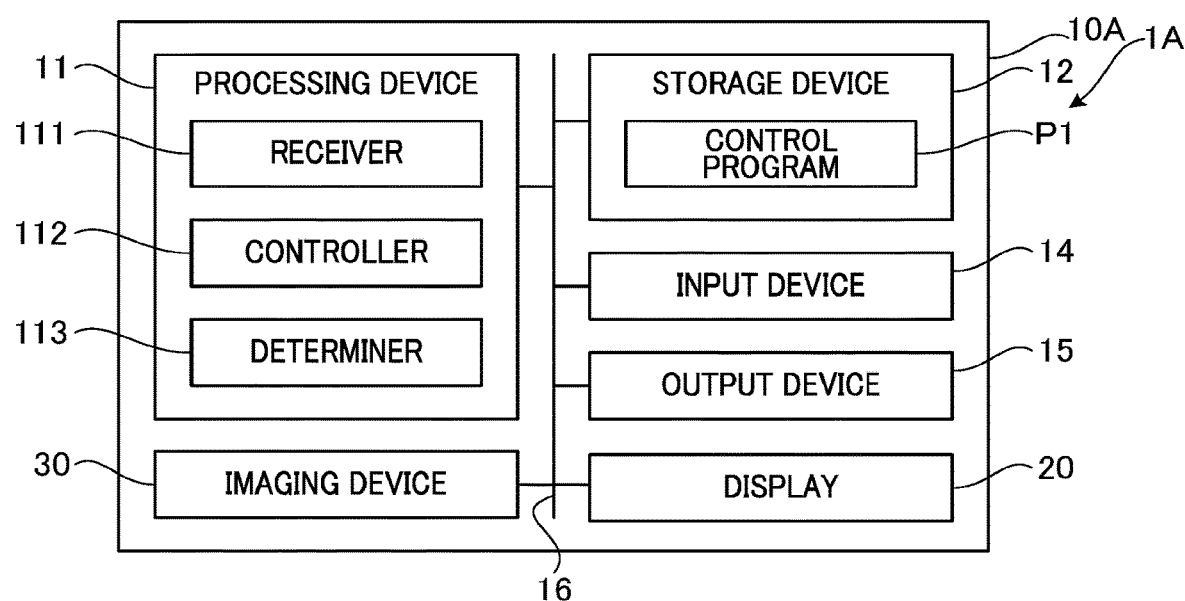
FIG. 12 is a block diagram illustrating a system using an information processing apparatus according to modification 3.

FIG. 12 is a block diagram illustrating a system 1A using an information processing apparatus 10A according to modification 3. In the system 1A illustrated in FIG. 12, the information processing apparatus 10A, the display 20 and the imaging device 30 are integrated. The display 20 and the imaging device 30 are communicatively connected to the bus 16 of the information processing apparatus 10A. In the information processing apparatus 10A, the communication device 13 of the above embodiment is omitted.

(4) In the above embodiments, a configuration of the information processing apparatus is exemplified in which the receiver 111 receives an input operation using a gesture of the user U. However, the present invention is not limited to this configuration. For example, the receiver 111 may receive the input operation made by the user U using a pointing device, such as a mouse. However, regarding the input operation using the gesture of the user U, a specific input operation is generally difficult compared to the input operation using a pointing device such as a mouse. Therefore, when the receiver 111 receives the input operation using the gesture, the effects obtained by applying the present invention are particularly significant.

(5) The block diagram used in the description of the above embodiments shows blocks of functional units. These functional blocks (components) are realized by freely selected combination of hardware and/or software. Units for realizing functional blocks are not particularly limited. That is, the functional blocks may be realized by one device that is physically and/or logically linked or may be realized by connecting two or more physically and/or logically separated devices in a direct and/or indirect manner (for example, a wired and/or wireless manner) and using these devices. The term "device" used in the description of the above embodiments may be replaced with another term such as circuit, device or unit.

(6) As long as there is no conflict, the orders of processing procedures, sequences, flowcharts and the like in the above embodiments may be changed. For example, in the method described in this specification, components of various steps in an exemplary order are presented, but the present invention is not limited to the presented specific order.

(7) In the above embodiments, input and output information and the like may be stored in a specific device (for example, a memory). The input and output information and the like may be overwritten, updated, or added. The output information and the like may be deleted. The input information and the like may be transmitted to another device.

(8) In the above embodiments, the determination may be performed using a value (0 or 1) represented by 1 bit, may be performed using a Boolean variable (Boolean: true or false), or may be performed by comparing numerical values (for example, comparison with a predetermined value).

(9) In the above embodiments, a case in which the storage device 12 is a recording medium that can be read by the processing device 11 and is, for example, a ROM or a RANI has been exemplified, but a flexible disk, a magneto-optical disk (for example, a compact disk, a digital versatile disk, a Blu-ray (registered trademark) disk), a smart card, a flash memory device (for example, a card, a stick, a key drive), a compact disc-ROM (CD-ROM), a register, a removable disk, a hard disk, a floppy (registered trademark) disk, a magnetic strip, a database, a server, and other suitable storage mediums may be used. The program may be transmitted via a network. The program may be transmitted through a telecommunication line via a communication network.

(10) In the above embodiments, the described information, signals and the like may be represented using any of various different technologies. For example, data, instructions, commands, information, signals, bits, symbols, chips and the like referred to throughout the entire description above may be represented by voltages, currents, electromagnetic waves, magnetic fields or magnetic particles, optical fields or photons, or freely selected combinations thereof.

(11) The functions exemplified in FIG. 2 are realized by a freely selected combination of hardware and software. The functions may be realized by a single device or be realized by two or more devices that are separated from each other.

(12) The program exemplified in the above embodiments is called software, firmware, middleware, a microcode, or a hardware description language, and regardless of what it is called, it should be broadly interpreted as meaning of instructions, instruction sets, codes, code segments, program codes, subprograms, software modules, applications, software applications, software packages, routines, subroutines, objects, executable files, execution threads, procedures, functions or the like. Software, instructions and the like may be transmitted and received via a transmission medium. For example, when software is transmitted from websites, servers, or other remote sources using wired technologies such as coaxial cables, fiber optic cables, twisted pairs and digital subscriber lines (DSL) and/or wireless technologies such as infrared rays, radio waves and microwaves, these wired technologies and/or wireless technologies are included in the definition of the transmission medium.

(13) In the above embodiments, information, parameters and the like may be represented by an absolute value, represented by a relative value with respect to a predetermined value, or may be represented by other corresponding information. For example, radio resources may be indexed.

(14) The above embodiments include a case in which the information processing apparatus 10 is a mobile station. The mobile station may be referred to as, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

(15) In the above embodiments, the term "connected" or any modification thereof means any direct or indirect connection or link between two or more components, and can include a case in which there are one or more intermediate components between two components "connected" to each other. The connection between components may be physical or logical, or a combination thereof. As used in this specification, two components can be considered to be "connected" to each other by using one or more wires, cables and/or printed electrical connections or, as some non-limiting and non-exhaustive examples, by using electromagnetic energy such as electromagnetic energy having wavelengths in a radio frequency range, a microwave range and an optical (both visible and invisible) range.

(16) In the above embodiments, the description "based on" does not mean "based only on" unless otherwise specified.

In other words, the description "based on" means both "based only on" and "based at least on."

(17) Any reference to components using the terms "first" and "second" used in this specification does not generally limit the amount or order of these components. These terms may be used in this specification as a convenient method of distinguishing two or more components. Therefore, references to first and second components do not mean that only two components may be used here, or that the first component must precede the second component in any form.

(18) As long as "including," "comprising", and modifications thereof in the above embodiments are used in this specification or the scope of the claims, these terms are intended to be inclusive, as the term "containing." The term "or" used in this specification or the scope of the claims is not intended to be an exclusive OR.

(19) Throughout this specification, for example, when articles like "a," "an," and "the" in English are added in translation, these articles may indicate plural components unless the context clearly indicates otherwise.

(20) It will be apparent to those skilled in the art that the present invention is not limited to the embodiments described herein. The present invention can be implemented as modified and changed modes without departing from the spirit and scope of the present invention defined based on the scope of the claims. Therefore, the description of this specification is for the purpose of exemplary description and does not have any restrictive meaning for the present invention. Many aspects selected from the aspects exemplified in this specification may be combined.

DESCRIPTION OF REFERENCE SIGNS

10 . . . Information processing apparatus
20 . . . Display
111 . . . Receiver
112 . . . Controller
CUR . . . Cursor
GI, GI-1, GI-2, GI-3, GI-4, GI-4A, GI-5, GI-5A and GI-6 . . . Item image
L1 . . . Distance
LB . . . Boundary line
RI . . . Acceleration region
RR . . . Deceleration region
RS, RS1 and RS2 . . . Region
U . . . User

The invention claimed is:

1. An information processing apparatus that displays item images that are arranged apart from each other and a cursor on a display, the information processing apparatus comprising:
   a receiver configured to receive operation information corresponding to details of a cursor operation in which a user moves the cursor;
   a controller configured to cause the display to display the cursor, based on the operation information; and
   a determiner configured to, when the operation information includes an instruction to move the cursor from an inside of one item image from among the item images to an outside of the one item image, determine whether there is another item image within a predetermined distance from the one item image, the another item image being in a direction of movement of the cursor,
   wherein when a result of determination made by the determiner is affirmative, the controller is configured to provide, inside the one item image, a deceleration region in which an amount of movement of the cursor per an amount of the cursor operation decreases below a reference value, and
   wherein when the result of determination made by the determiner is negative, the controller is configured not to provide, inside the one item image, the deceleration region.

2. The information processing apparatus according to claim 1, wherein the controller is configured to provide, between the one item image and the another item image, an acceleration region in which an amount of movement of the cursor per unit amount of input operation relative to the receiver increases.

3. The information processing apparatus according to claim 1, wherein the controller is configured to set a ratio of the deceleration region to a size of the one item image according to the size of the one item image.

4. The information processing apparatus according to claim 1, wherein the deceleration region is provided in a part of the one item image along the outer circumference of the one item image.

5. The information processing apparatus according to claim 1, wherein the deceleration region is provided over the entire one item image.

6. The information processing apparatus according to claim 1, wherein the controller is configured to set an amount of movement of the cursor per amount of the cursor operation to be greater when the cursor is positioned in a region other than the item images than when the cursor is positioned inside the one item image.

7. The information processing apparatus according to claim 1,
wherein the one item image and the another item image are arranged apart from each other,
wherein the controller is configured to provide a boundary line between the one item image and the another item image,
wherein when the cursor is positioned in a region between the boundary line and the other item image, the controller is configured to determine that the one item image is selected with the cursor, and
wherein when the cursor is positioned in a region between the boundary line and the another item image, the controller is configured to determine that the another item image is selected with the cursor.

8. The information processing apparatus according to claim 1, wherein when the cursor is positioned in a region other than the item images, the controller is configured to change an amount of movement of the cursor per an amount of the cursor operation depending on a position between the cursor and an item image in the direction of movement of the cursor from among the item images.

9. The information processing apparatus according to claim 1, wherein the receiver is configured to receive the operation information based on data from an imaging device that detects a gesture of the user.

10. The information processing apparatus according to claim 2, wherein the controller is configured to set a ratio of the deceleration region to a size of the one item image according to the size of the one item image.

* * * * *